United States Patent

Griffes et al.

(10) Patent No.: US 10,445,534 B2
(45) Date of Patent: Oct. 15, 2019

(54) SELECTIVE STORAGE DEVICE WIPING SYSTEM AND METHOD

(71) Applicants: Donald E. Griffes, American Fork, UT (US); Daniel S. Pedigo, Santaquin, UT (US); Tuvia Barak, Palisades, NY (US)

(72) Inventors: Donald E. Griffes, American Fork, UT (US); Daniel S. Pedigo, Santaquin, UT (US); Tuvia Barak, Palisades, NY (US)

(73) Assignee: Whitecanyon Software, Inc., American Forks, UT (US)

( * ) Notice: Subject to any disclaimer, the term of this patent is extended or adjusted under 35 U.S.C. 154(b) by 20 days.

(21) Appl. No.: 15/463,894

(22) Filed: Mar. 20, 2017

(65) Prior Publication Data

US 2017/0255797 A1    Sep. 7, 2017

Related U.S. Application Data

(63) Continuation of application No. 14/632,525, filed on Feb. 26, 2015, now Pat. No. 9,665,743.

(51) Int. Cl.
  *G06F 11/14*    (2006.01)
  *G06F 21/88*    (2013.01)

(52) U.S. Cl.
  CPC .......... *G06F 21/88* (2013.01); *G06F 11/1441* (2013.01); *G06F 2221/2143* (2013.01)

(58) Field of Classification Search
  USPC ........................................................ 711/166
  See application file for complete search history.

(56) References Cited

U.S. PATENT DOCUMENTS

| 6,014,724 | A  | * | 1/2000  | Jenett ................... G06F 3/0607 711/103 |
| 8,244,678 | B1 | * | 8/2012  | Hartland ............. H04L 67/1095 707/610 |
| 8,510,505 | B1 | * | 8/2013  | van Reitschote ......................... G06F 17/30233 707/610 |
| 8,868,501 | B2 |   | 10/2014 | Borden ............. G06F 17/30097 707/638 |
| 2001/0038032 | A1 | * | 11/2001 | Kang ...................... G06F 3/062 235/375 |
| 2002/0077999 | A1 | * | 6/2002  | Fergus ................ G06F 21/6209 |
| 2002/0078026 | A1 | * | 6/2002  | Fergus ................. G06F 3/0622 |
| 2002/0162011 | A1 | * | 10/2002 | Tanaka ................... G06F 21/88 726/3 |
| 2006/0136676 | A1 | * | 6/2006  | Park ..................... G06F 3/0616 711/144 |
| 2006/0272020 | A1 | * | 11/2006 | Gardner ............... G06F 9/4411 726/23 |

(Continued)

*Primary Examiner* — Mano Padmanabhan
*Assistant Examiner* — Jean C Edouard
(74) *Attorney, Agent, or Firm* — Clifford H. Kraft

(57) ABSTRACT

A storage device wiping system and method that is activated from a remote server or other site when a computer is reported lost or stolen. The wipe technique selectively wipes all data files and free space before beginning to wipe the entire storage device. This causes any personal data files, photos, videos, and the like to be wiped first. Once the wiping process starts, it will continue until complete. The process starts or continues whenever the computer is booted. Only when all personal and sensitive data is wiped, will the system then change the encryption key (if there is one) and begin wiping the entire storage device.

10 Claims, 5 Drawing Sheets

(56) References Cited

U.S. PATENT DOCUMENTS

| | | | |
|---|---|---|---|
| 2006/0282446 A1* | 12/2006 | Suzuki | G06F 3/08 |
| 2007/0043900 A1* | 2/2007 | Yun | G06F 3/061 |
| | | | 711/103 |
| 2007/0277000 A1* | 11/2007 | Ohtsuka | G06F 12/1027 |
| | | | 711/133 |
| 2010/0306760 A1 | 12/2010 | Mulligan | G06F 9/44505 |
| | | | 717/174 |
| 2011/0113231 A1 | 5/2011 | Kaminsky | G06F 21/575 |
| | | | 713/2 |
| 2011/0197159 A1 | 8/2011 | Chaganti | H04L 29/06 |
| | | | 715/781 |
| 2012/0016850 A1* | 1/2012 | Borden | G06F 17/30097 |
| | | | 707/695 |
| 2012/0054456 A1* | 3/2012 | Grube | G06F 3/0619 |
| | | | 711/158 |
| 2013/0104192 A1* | 4/2013 | Burchett | G06F 21/602 |
| | | | 726/1 |
| 2014/0033271 A1* | 1/2014 | Barton | H04L 67/10 |
| | | | 726/1 |
| 2014/0040638 A1* | 2/2014 | Barton | H04L 41/00 |
| | | | 713/193 |
| 2014/0040979 A1* | 2/2014 | Barton | H04L 63/20 |
| | | | 726/1 |
| 2014/0109176 A1* | 4/2014 | Barton | G06F 9/45533 |
| | | | 726/1 |
| 2014/0122821 A1* | 5/2014 | Park | G06F 3/0652 |
| | | | 711/166 |
| 2014/0188804 A1* | 7/2014 | Gokhale | G06F 21/6218 |
| | | | 707/645 |
| 2014/0253466 A1* | 9/2014 | Brewer | G06F 3/03545 |
| | | | 345/173 |
| 2014/0281519 A1 | 9/2014 | Erofeev | G06F 21/6218 |
| | | | 713/165 |
| 2015/0339497 A1* | 11/2015 | Kurian | G06F 21/78 |
| | | | 726/34 |

* cited by examiner

SELECTIVE STORAGE DEVICE WIPING SYSTEM AND METHOD

This is a continuation of application Ser. No. 14/632,525 filed Feb. 26, 2015. Application Ser. No. 14/632,525 is hereby incorporated by reference in its entirety.

BACKGROUND

Field of the Invention

The present invention relates generally to computer security techniques and more particularly to a remotely-activated system that will cause a computer to selectively wipe its disk or other storage device if the computer has been lost, stolen or otherwise enters a situation where data may be compromised.

Description of the Prior Art

Computer disk wiping is known in the art. This is the process of over-writing addresses or tracks with known data patterns. It is possible to remove all data from a hard disk or other type of storage device thus rendering the original data unrecoverable by writing, and sometimes re-writing every sector with a known pattern. Some standards (such as some U.S. Department of Defense standards) require that every sector be over-written three times or some other number of times, and in some cases with a different data pattern each time. This can be very time-consuming taking many hours with large storage devices. Typical storage device over-write patterns (on a byte basis) may be alternating patterns such as 0x55 for the first pass, 0xAA for the second pass, and 0x3C for the third pass for example. It is important in storage device-wiping to make sure that storage at unmapped addresses is also be wiped. On storage devices that encrypt data, the encryption key may also be changed making it very difficult to read any stored data.

Many computers of all types are lost or stolen each year. It would be advantageous to have a system that could be managed from a remote location that would force a computer that is lost or stolen to wipe its disk or storage device (many electronic devices use storage devices that are not rotating storage devices) so that data is not compromised. However, as previously stated, simply wiping every address of today's large storage devices takes a long time. In the time it takes to wipe an entire storage device, a data thief could recover many files before their addresses were wiped. It would be advantageous to, not only control and activate wiping from a remote location, but to have a system that would wipe selected files first to get rid of all personal and confidential data before performing an entire storage device wipe. This would overwrite important files very quickly preventing their possible theft.

SUMMARY OF THE INVENTION

The present invention relates to a storage device wiping system and method that is activated from a remote server or other site when a computer is reported lost or stolen. The wipe technique selectively and quickly writes over or wipes all data files and free space before beginning to wipe the entire storage device. This causes any personal data files, photos, videos, and the like to be wiped first. Once the wiping process starts, it will generally continue until complete. The process starts or continues whenever the computer is booted. Only when all personal and sensitive data is wiped, will the system then change the encryption key (if there is one) and begin wiping the entire storage device. This allows removal of sensitive data in a fraction of the time required for a complete wipe. The system can be implemented as an application, in firmware, as an external hardware module, or by other means. In one embodiment, the wipe system can be implemented in storage device control firmware (firmware that is part of the storage device itself) so that it begins wiping independently of any computer control if the storage device is removed from one computer and installed in another.

DESCRIPTION OF THE FIGURES

Attention is directed to several figures that illustrate features of the present invention.

Several drawings and illustrations have been provided to aid in understanding the present invention. The scope of the present invention is not limited to what is shown in the figures.

DESCRIPTION OF THE PREFERRED EMBODIMENT

The present invention relates to a system and method for preventing loss of personal information and other critical files from a lost or stolen target computer that includes assigning a unique ID to the target computer and storing this ID on a remote control server computer in a database accessible by the remote server. The database does not need to be co-located with the remote server, but should be accessible by it at least over a network. The control server is typically located at a control center that manages many different user computers. The target computer communicates with the control server over the network, or by any other method.

Figure 1:
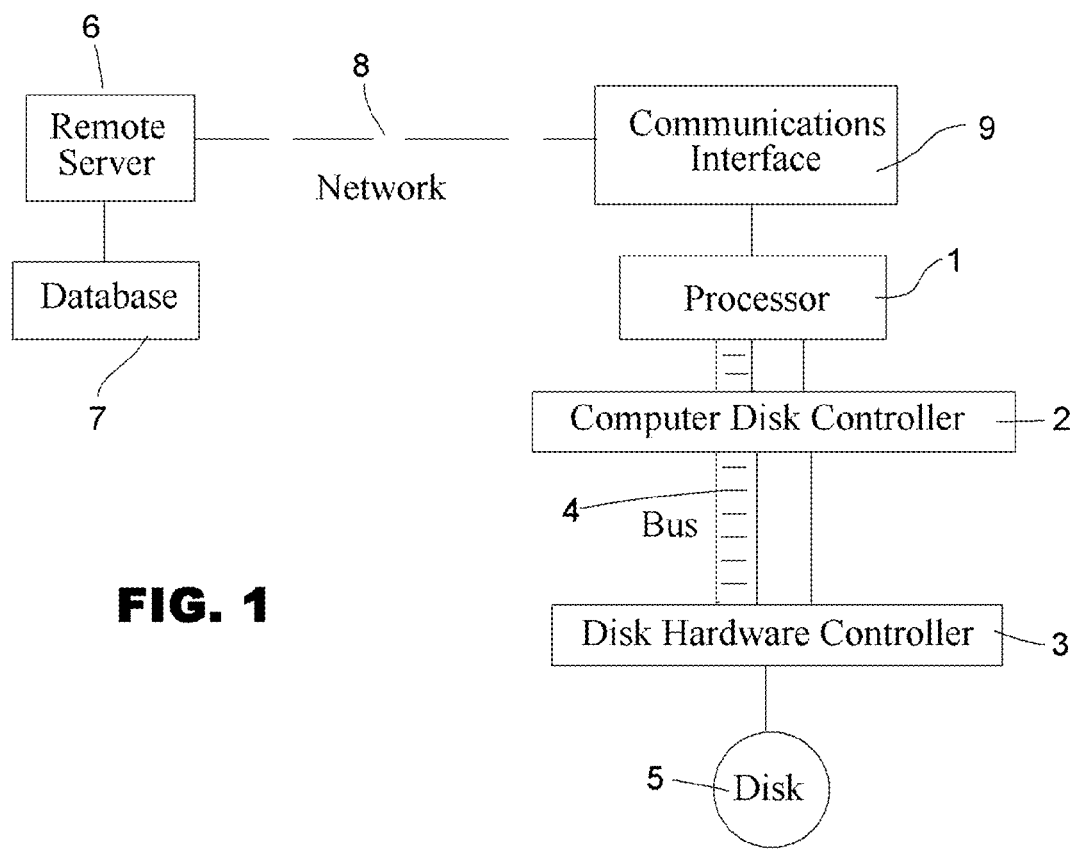
FIG. 1 shows a block diagram of an embodiment of the present invention.

A typical embodiment of the invention can be seen by turning to FIG. 1. The target computer's processor 1 communicates via a communications interface 9 with a remote server 6 over a network 8. The remote server 6 has access to a database 7 that is either stored on a physically connected device or that resides somewhere else in the network 8. The target processor 1 also has a direct connection with a computer storage device controller 2 (which is usually part of an I/O chip mounted on the motherboard). This controller 2 is connected to the storage device hardware controller 3 that is part of the storage device hardware 5. Data and commands travel over buses 4 from the processor to the storage device.

As long as the target computer is not reported lost or stolen, a status is assigned to its ID as "safe" in the database 7 (or some similar status indicator). If the computer is lost or stolen, its status is changed to "unsafe". This can be accomplished by the control center receiving a report from the owner of the computer either by telephone, online or by any other method, or in some cases, the computer may be tracking its own location and know that it has been stolen. The person or computer making the report can be identified as having authority by password, codeword or by any other verification method.

A small software, firmware or hardware module can be placed on the target computer that runs every time the target computer is booted. This module can also run periodically at a time interval set by the owner or by the control center. This module transmits the target computer ID to the control server 6 over the network 8 and requests the status of the computer. The control server 6 checks its database 7 and returns a status of safe or unsafe.

As long as the status comes back safe, the module ends (or returns to a background state) and turns control over to normal operating system or Basic Input/output System (BIOS) type software. To run periodically, before turning over control to the normal system, the module can set a timer for a high priority interrupt or the like to occur the next time it is to run. Upon this timer interrupt, either the module is re-initialized and started or if simply dormant, it is awakened.

If the status comes back unsafe, the module can become autonomous and begin wiping the target computer's storage device in a very selective manner. For extra security, the module can double check with the control server over the network to make sure the status has not been received in error. For high reliability, the control server can send an encrypted word or command that can only be decrypted by that target computer (such as by a special key or a public/private key system). For example, the server could store the target computers public key in its database along with the ID and status. A wipe command could then be encrypted using the target computer's public key and transmitted. Only the correct target computer could decrypt the wipe command using its private key. While this extra security is optional, it is preferred since it prevents any accidental wiping that was unintended both on the particular target computer or on another computer that received the command in error.

An status message indicating unsafe can cause wiping of the entire storage space as previously described, or optionally can contain a list of files or folders to be removed without a full wipe. The following are the possibilities for an unsafe status:

1) Perform a full wipe, overwriting all user data files and free space first.
2) Overwrite all user data files and free space without performing a full wipe.
3) Overwrite only the following folders and/or files [list].

Once the wipe module has determined to wipe, it has no further need to communicate with the control server. However, it can optionally send a message to the control server notifying it that wiping has started. If the target computer is powered down, the module will start where it left off the next time the target computer is booted.

While it is possible in some embodiments of the invention to build in the ability for the control server to stop the wiping operation, this leaves a security trapdoor that can defeat the system. It is therefore preferred that once wiping is authorized, there is no way to stop it, and there is no further communication with the control server.

Figure 2:
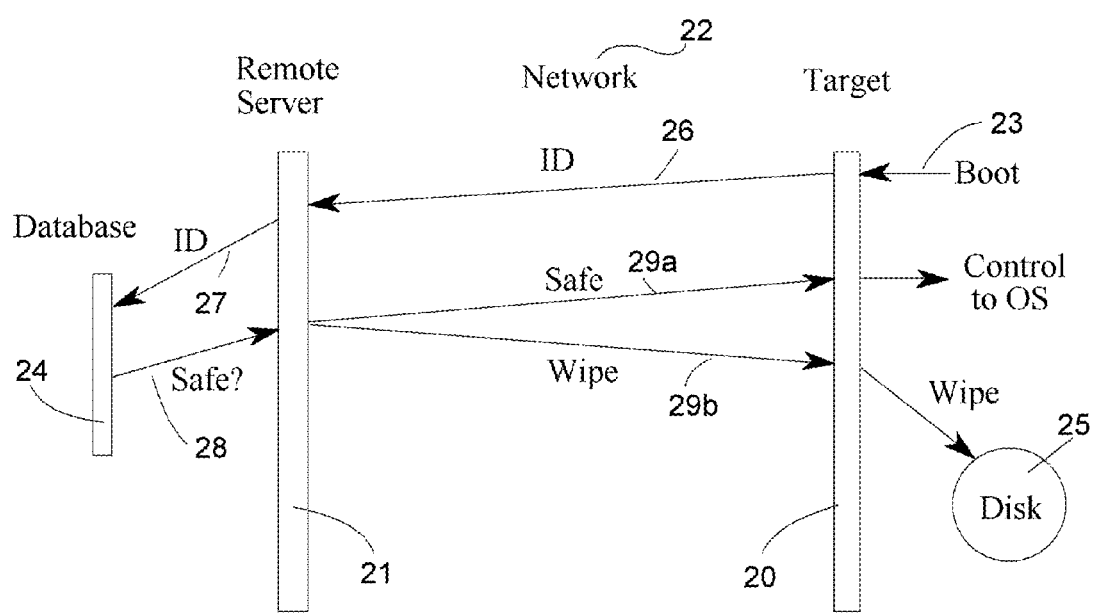
FIG. 2 shows a possible message flow between the remote station and the target computer.

FIG. 2 shows a message flow diagram between the target computer 20 and the remote server 21 over a network 22. Upon power up or any other boot condition 23, a message 26 containing the target computer's ID is transmitted to the remote server. The remote server checks 27 its database 24 to find the status of the target computer. The status 28 safe or unsafe is returned from the database to the remote server. The remote server 21 then sends a response message 29a or 29b over the network back to the target computer 20. This response message contains the status or an indication of the status. If the status is safe, the target computer 20 turns control over to the next normal step in its startup sequence. If the status is unsafe, the target computer 20 begins, or continues, a wipe operation on the storage device 25.

The wipe operation is carried out selectively by first either choosing files from an ordered, or unordered, file list placed on the target computer by either the owner/user or by the control server, or by following a predetermined file order. Generally, it is desirable to first wipe all user files. These are any type of file that was created or downloaded on the target computer by the user or put on the computer at initial software loading time. These include document files, text files, photos, videos, spreadsheets, and any other type of file that can be created by any application (on a Microsoft system, this generally includes any file that does not have a .exe, .dll or other system or network file suffix). In other words, all of the files that might contain any information considered personal by the owner are overwritten first.

Next, free space should be overwritten since free space usually contains numerous fragments of user files including temporary buffers, parts of deleted files and the like. If free space were not wiped, a significant amount of user data would remain. Next, the module can optionally wipe all applications (which are executable files) and, if desired, part or all of the operating system (including the registry on machines running Microsoft Windows operating systems). Whether, applications and/or the operating system are wiped can be determined by the user's file list if one is used.

Finally, the module optionally changes the storage device's encryption key (if there is one) and begins to perform a normal wipe of all remaining storage device space (or of all storage device space from the beginning).

As previously stated, prior art wipe systems simply began wiping addresses starting from the lowest to the highest address. These systems had no need to know anything about the file system in use. However, for the wipe module to selectively wipe on a file-by-file bases, it must be able to identify those addresses that belong to a particular file. In order to do this, it must first identify what type of a file and directory system is being used, be able to read the directory, and from the directory determine what addresses belong to a particular file. There are two ways it can do this: 1) the wipe module can make system calls to the operating system (if the operating system is running) to retrieve addresses, or 2) it can operate independently of the operating system. The latter method is preferred; however, it makes the module somewhat more complex. The main reason for not depending on the operating system is that the module ideally runs at boot time before the operating system is brought up.

Also, the module typically must contact the remote control server 21 over the network 22 at least once when it starts. This can be done using the capabilities of the operating system to perform network communication (using the standard communications stack); however, direct communication can also be performed over the network by the module. To do this, the module must first determine what type of communication hardware the target computer has (wireless, plugged-in Ethernet (™) or the like). It must then set up communications onto the network (for example by using a wireless interface) and send the correct sequence of commands over the network to the control server. While this is more difficult to implement, it is also more secure. As stated, once, the module has been given a wipe command by the control server, it generally cannot be reset. This assures that it is very difficult to disable it once it has started.

For the wipe module to independently access the communication interface without the help of the operating system, it is necessary to be able to identify the network interface and to operate it. This can be made much easier by supplying the wipe module with a link to the a communications driver program when it is loaded onto the particular target machine. If that is done, the wipe module needs only to follow standard interface rules for all drivers, and does not have to identify the actual communications hardware or be concerned with what type of interface it is.

Of course, a knowledgeable thief could attempt to thwart the module by taking measures to prevent network communication until the desired data had been removed. To avoid this, the module can determine that it is unable to contact the system server to obtain the status of the computer. In this particular case, the module can go into an undecided state, and while not actually starting a wipe operation, it can prevent normal operation of the computer until it can contact the control server.

Figure 3:
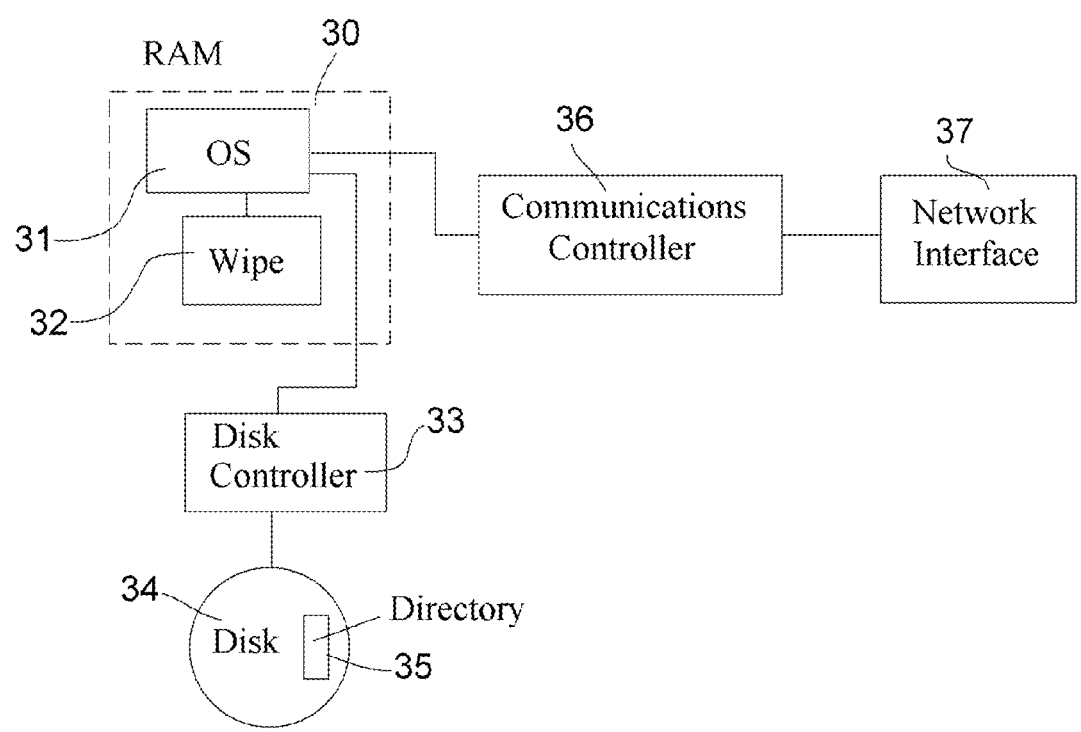
FIG. 3 shows a block diagram of an embodiment that executes under the Operating System (OS).

The case where the wipe module is an application and is loaded into random access memory (RAM) and runs under the operating system is shown in FIG. 3. The operating system 31 (or parts of it) are loaded into Random Access Memory (RAM) memory 30 (typically using virtual addressing). The wipe module 32 in this mode can run as a privileged application that is automatically started after the operating system boots (and can also run periodically using a timer). The wipe module 32 accesses the network though a communications controller 36 that interfaces with a network physical device 37. The network access can be managed by commands to the operating system 31 using the standard communications stack and running as a high priority application. Access to the storage device 34 and the file directory 35 stored on the storage device is through normal operating system commands. These commands can be high level allowing the operating system to manage the directory and file interface, or low level using device storage addresses. Actual wipe writes to addresses can be low level; however, the wipe module, running as an application, must have a high enough privilege level to allow it to directly write to the storage device addresses at the address level.

In the case that the module does not rely on the operating system (which is a more secure mode) where it has determined that it must wipe, the module takes control of the computer after boot. On its first execution, it can determine what type of file system is present (FAT, NTFS, etc.), read the main directory, and begin to execute without ever turning control over to the operating system or allowing the operating system to boot. It can parse the main directory (and hence sub-directories), searching for user files and wiping their associated addresses file by file as previously described.

Figure 4:
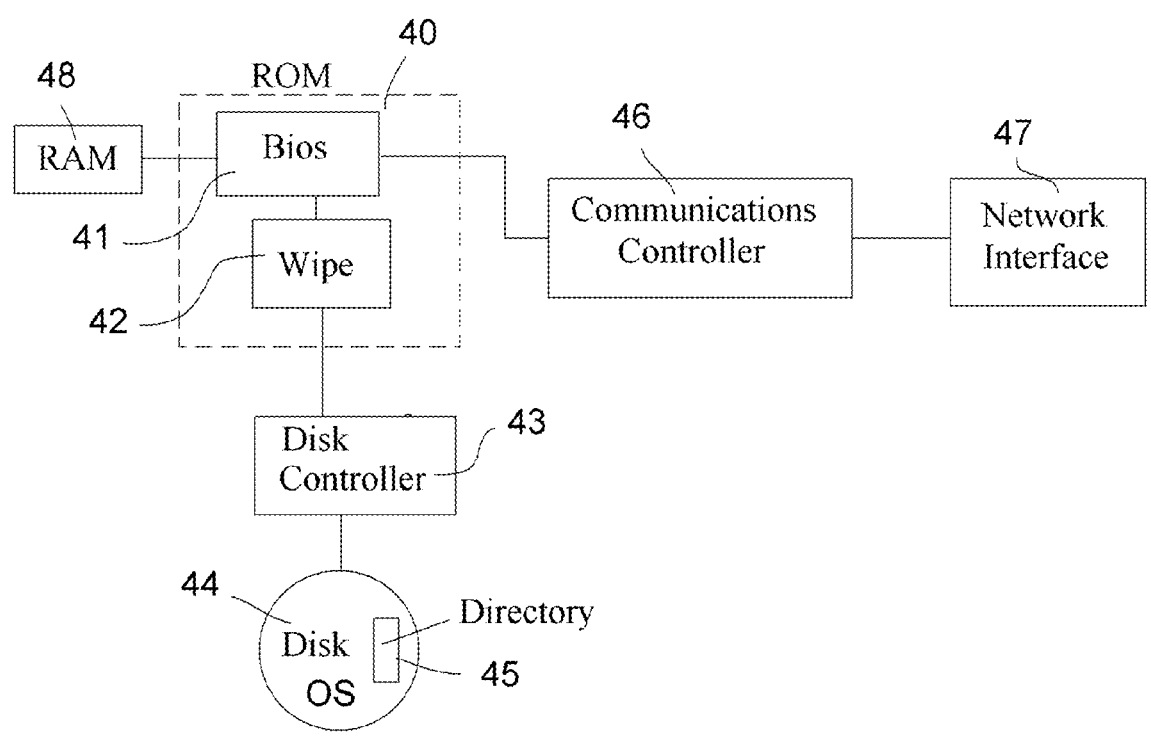
FIG. 4 shows a block diagram of an embodiment of the invention that uses computer firmware.

FIG. 4 shows a block diagram of an embodiment where the wipe module 42 resides in read only memory (ROM), or some other form of permanent or semi-permanent memory 40 along with boot firmware such as a BIOS 41. The wipe module 42 can use the same part of RAM memory 48 for buffers and the like as the boot firmware 41. In this case, BIOS commands can be used to interface with the communications controller 46 and the physical network interface 47. Again, a link to a driver module can be supplied to the wipe module 42 when it is loaded on a specific target machine. The wipe module 42 can either directly interface with the storage device controller 43 or use BIOS commands to interface. Again, the wipe module 42 must be able to determine the type of file system used on the storage device 44 and read and use the directory 45. The wipe module can then selectively wipe user files, followed by free space, followed by a general wipe as explained above.

The most secure embodiment of the invention does not use the computer's processor at all. Rather, the wipe module is stored and runs on the storage device's controller hardware/firmware (or is implemented as an independent hardware device). This embodiment generally does not communicate with a control server. Rather, it simply determines if the storage device has been moved to a different computer. If it has, the module begins a selective wipe, and will not allow normal storage device operation to take place. This particular embodiment of the invention is effective when a storage device is removed from one computer and placed in another (perhaps to avoid a computer software/firmware module that would perform a wipe). Typically, this embodiment is used for high-security storage devices. When the storage device is first placed in a computer, the wipe module is in a passive state. In this state, it determines what computer it is residing in. It does this by reading a code or number over its communication bus. The storage device then records this computer ID, and continues to stay passive as long as the storage device resides in that computer. Every time the computer is powered up, it again determines what computer it is in. If the computer is different, or if it cannot determine a computer, it begins the selective wipe operation.

There are several possibilities for this embodiment:
1) The storage device determines what computer it is in by reading an ID from the computer.
2) The computer sends the storage device an ID code that must be received before normal storage operation can take place. This code can then be stored in the storage device controller (optionally encrypted). If it finds itself in a different computer, wiping can begin.

Optionally, in some embodiments, the storage device can pretend to function normally (to fool a thief), but in reality be wiping.

Figure 5:
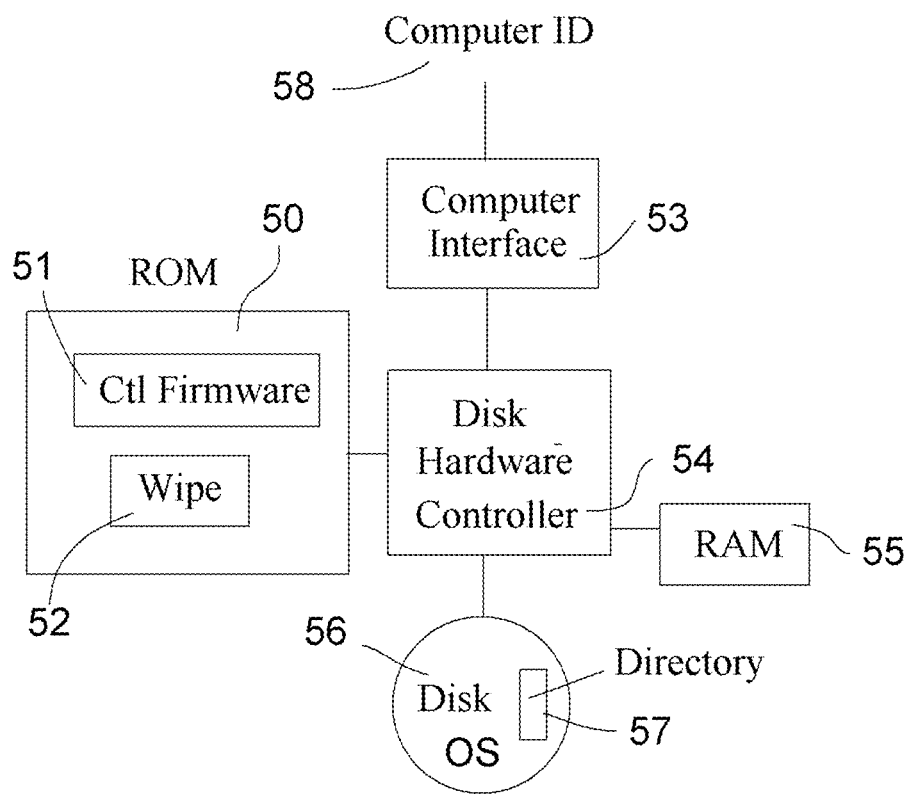
FIG. 5 shows a block diagram of an embodiment of the invention that uses storage device controller firmware.

FIG. 5 shows a block diagram of an embodiment that runs on a storage device hardware system. A hardware storage device controller 54 interfaces with a ROM memory 50 and a RAM memory 55. This is generally part of the storage device or device hardware that is supplied by the device manufacturer. Therefore, this embodiment generally requires cooperation of the storage device manufacturer. Storage device control firmware 51 along with the wipe module 52 is stored in the ROM 50, and is executed by the controller 54. The controller communicates with the computer the storage device is installed in over a standard interface 53. The storage device controller 54 can determine a computer ID 58 over that interface 53 as has been described. The device controller 54 can thus determine if the storage device has been moved to a different computer. If so, a wipe operation can begin. Again, the wipe module 52 must determine the type of file system and read the directory 57. It can then selectively wipe addresses belonging to data files that in the order previously discussed. In this embodiment, once the wipe begins, it typically cannot be stopped.

The present invention provides a very rapid way of getting rid of important sensitive personal data and files on a storage device that is marked as unsafe either by being reported stolen, or in some embodiments by having the storage device moved to a different computer. The present invention is much faster than prior art techniques that attempt to wipe the entire storage device without regard to the file structure or content.

Several descriptions and illustrations have been given to aid in understanding the present invention. One with skill in the art will realize that numerous changes and variations may be made without departing from the spirit of the invention. Each of these changes and variations is within the scope of the present invention.

The invention claimed is:

1. A method for converting personal information on a storage device installed in a target computer from an accessible state to a inaccessible state comprising:

placing a set of executable instructions on the target computer, the target computer connectable to the network; the set of executable instructions automatically executing whenever the target computer boots;

the set of executable instructions transmitting a unique ID of the target computer over the network to the control computer and requesting status of the target computer;

the set of executable instructions receiving the status of the target computer over the network and either turning control over to the operating system or firmware of the target computer if the status is safe leaving the personal data in the accessible state, or initiating a wipe operation on the target computer if the status is unsafe converting the personal data to an inaccessible state;

if the status is unsafe the set of executable instructions selectively wiping addresses belonging to specific files from the storage device by sending write commands to the storage device, the write commands referencing wipe data patterns the wipe operation proceeding on a file-by-file basis first wiping data files, then wiping free space, and finally wiping the entire storage device.

2. The method of claim 1 further comprising the set of executable instructions performing the steps of transmitting the ID and requesting status receiving the status and turning control over or initiating a wipe operation periodically during normal operation of the target computer.

3. The method of claim 1 wherein said data files include documents, photographs, videos and spreadsheets.

4. The method of claim 1 further comprising wiping all applications before commencing wiping of the entire storage device.

5. The method of claim 1 further comprising wiping all executable binary files before commencing wiping of the entire storage device.

6. The method of claim 1 further comprising changing an encryption key related to the storage device memory before commencing wiping the entire storage device.

7. The method of claim 1 further comprising storing a list of filenames on the target computer to be overwritten on the storage device.

8. The method of claim 7 comprising wiping files from the storage device according to the list of filenames.

9. The method of claim 1 wherein the wipe operation resumes each time the target computer is booted.

10. A method for converting personal information on a storage device installed in a target computer from an accessible state to a inaccessible state comprising:

placing a set of executable instructions on the target computer, the target computer connectable to the network; the set of executable instructions automatically executing whenever the target computer boots;

the set of executable instructions transmitting a unique ID of the target computer over the network to the control computer and requesting status of the target computer;

the set of executable instructions receiving the status of the target computer over the network and either turning control over to the operating system or firmware of the target computer if the status is safe leaving the personal data in the accessible state, or initiating a wipe operation on the target computer if the status is unsafe converting the personal data to an inaccessible state;

if the status is unsafe the set of executable instructions selectively wiping addresses belonging to specific files from the storage device by sending write commands to the storage device, the write commands referencing wipe data patterns the wipe operation proceeding on a file-by-file basis.

* * * * *